(12) United States Patent
Svancarek et al.

(10) Patent No.: US 6,249,274 B1
(45) Date of Patent: Jun. 19, 2001

(54) COMPUTER INPUT DEVICE WITH INCLINATION SENSORS

(75) Inventors: Mark K. Svancarek, Redmond, WA (US); Hiroyuki Bonde, Kanagawa-ken (JP); Gary L. Gordon, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/108,002

(22) Filed: Jun. 30, 1998

(51) Int. Cl.[7] ................................................ G09G 5/08
(52) U.S. Cl. .................................................... 345/158
(58) Field of Search .................... 345/156, 157, 345/158

(56) References Cited

U.S. PATENT DOCUMENTS

| | | | |
|---|---|---|---|
| 4,445,376 | * | 5/1984 | Merhav .................................. 73/510 |
| 4,608,641 | * | 8/1986 | Snell ..................................... 364/434 |
| 4,711,125 | * | 12/1987 | Morrison ............................ 73/178 R |
| 4,712,426 | * | 12/1987 | Peters ..................................... 73/505 |
| 4,839,838 | * | 6/1989 | LaBiche et al. ................. 364/709.11 |
| 5,627,565 | * | 5/1997 | Morishita et al. .................... 345/158 |
| 5,963,194 | * | 10/1999 | Umeda et al. ........................ 345/157 |

* cited by examiner

*Primary Examiner*—Richard Hjerpe
*Assistant Examiner*—Kevin M. Nguyen
(74) *Attorney, Agent, or Firm*—Westman, Champlin & Kelly, P.A.

(57) ABSTRACT

A computer input device includes a user manipulable portion having a first primary axis of motion. An inclination sensor has a first sensing axis. The inclination sensor is coupled to the user manipulable portion such that the first sensing axis is disposed at a first offset angle relative to the first primary access of motion. An output component is coupled to the inclination sensor and provides output information indicative of sensed inclination.

19 Claims, 7 Drawing Sheets

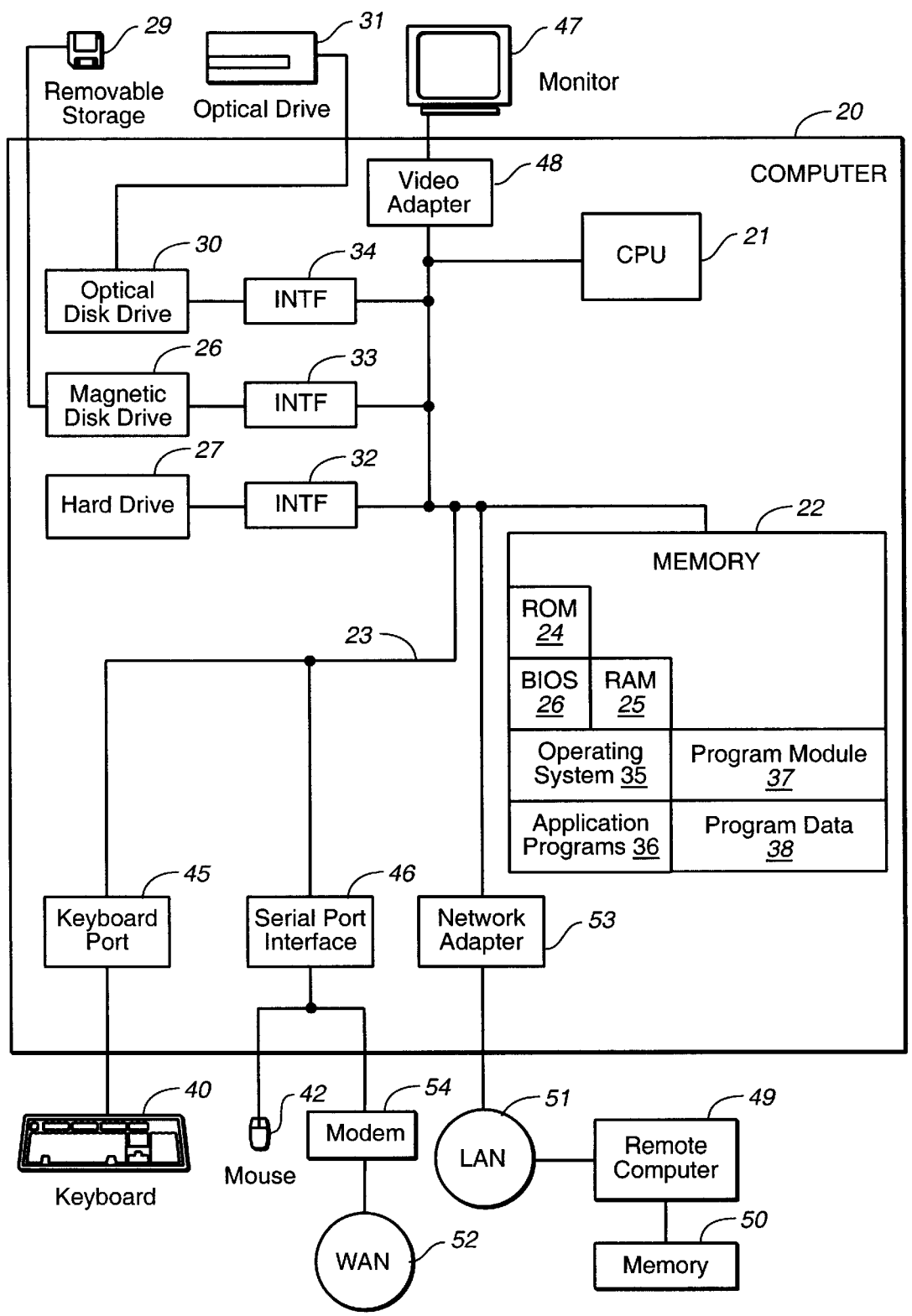
FIG._1

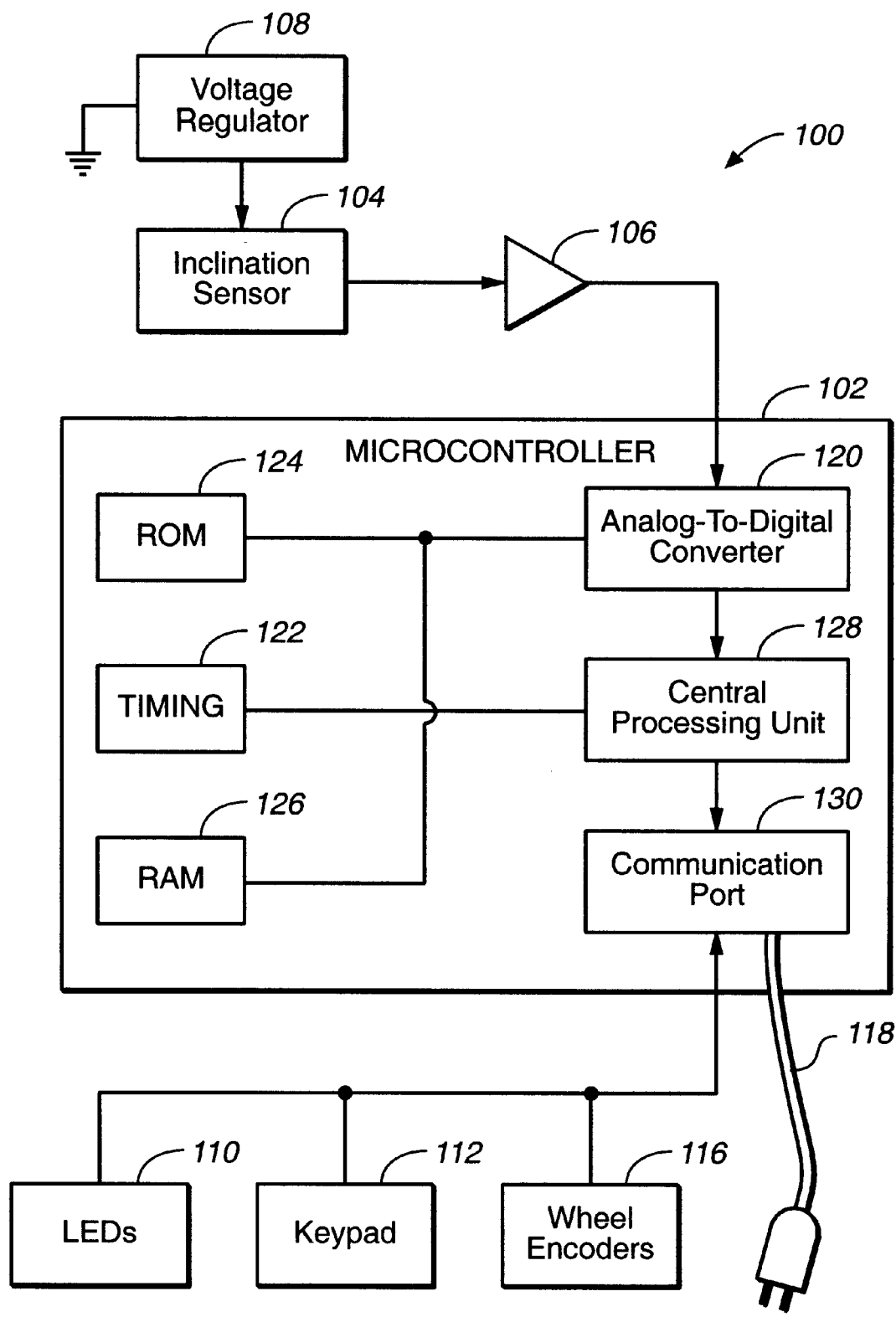
FIG._2

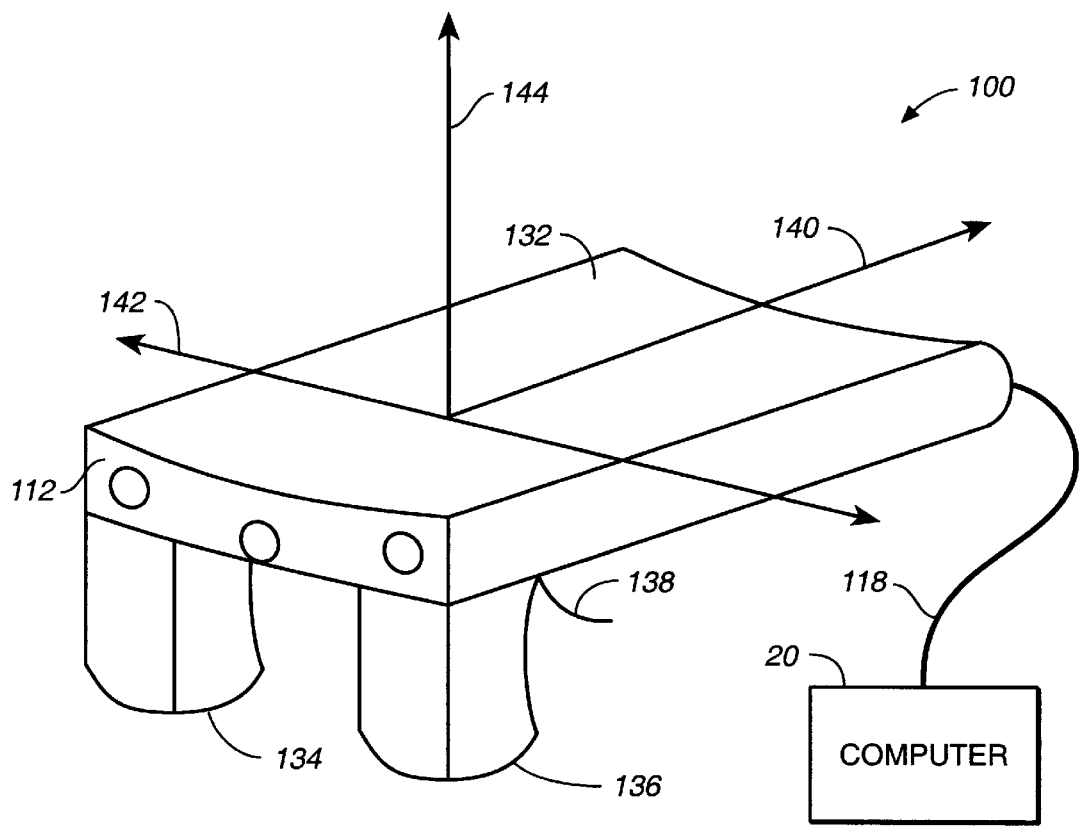
FIG._3A
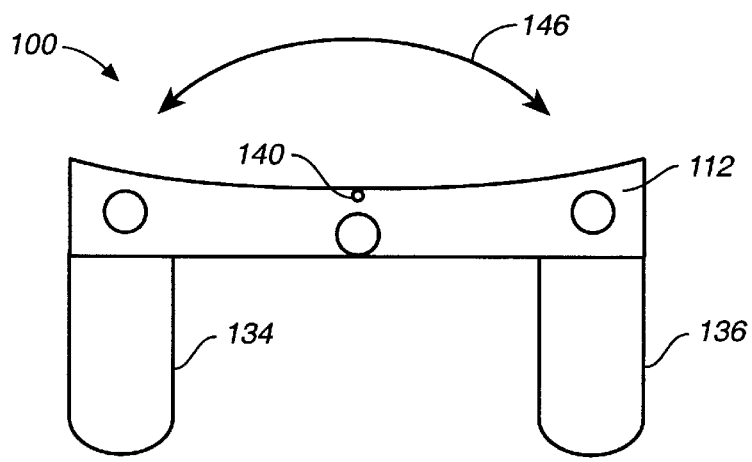
FIG._3B

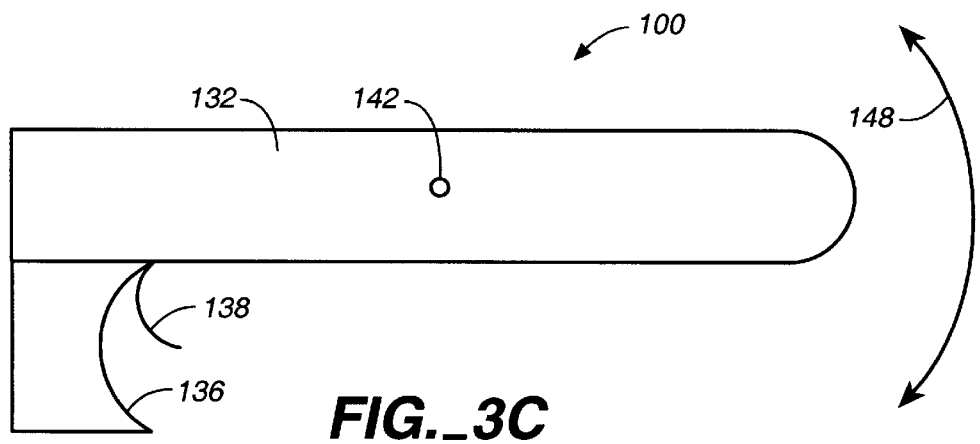
FIG._3C
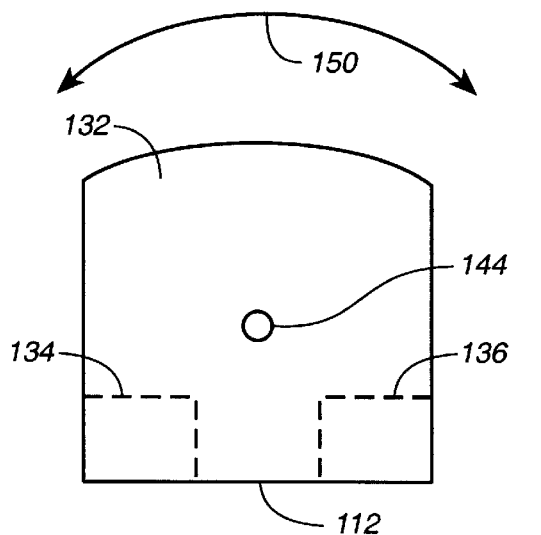
FIG._3D
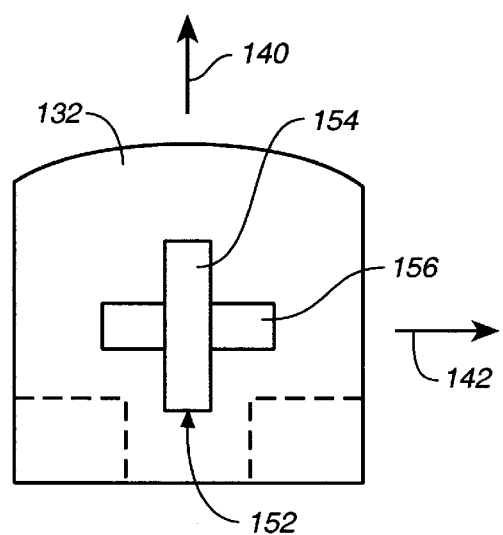
FIG._3E
(PRIOR ART)

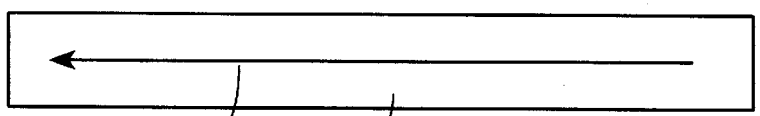
FIG._4A
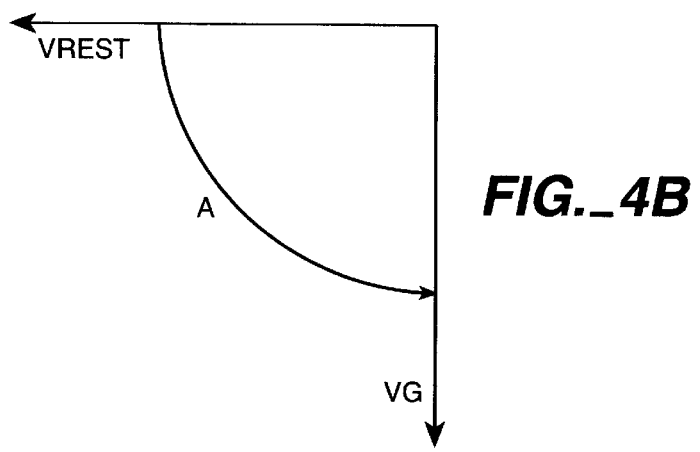
FIG._4B
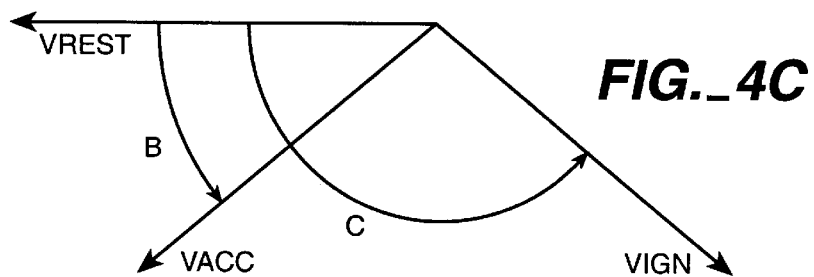
FIG._4C
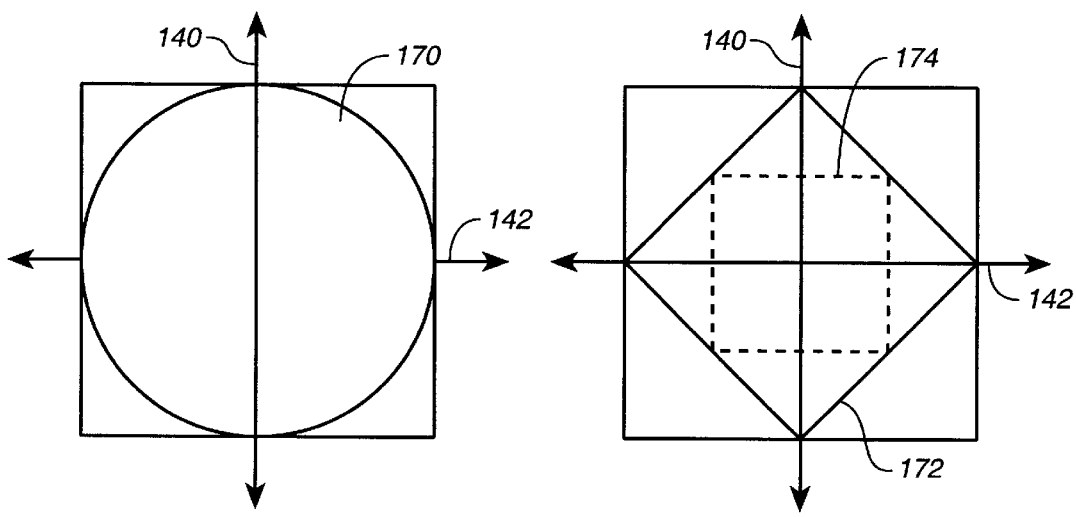
FIG._5A  FIG._5B

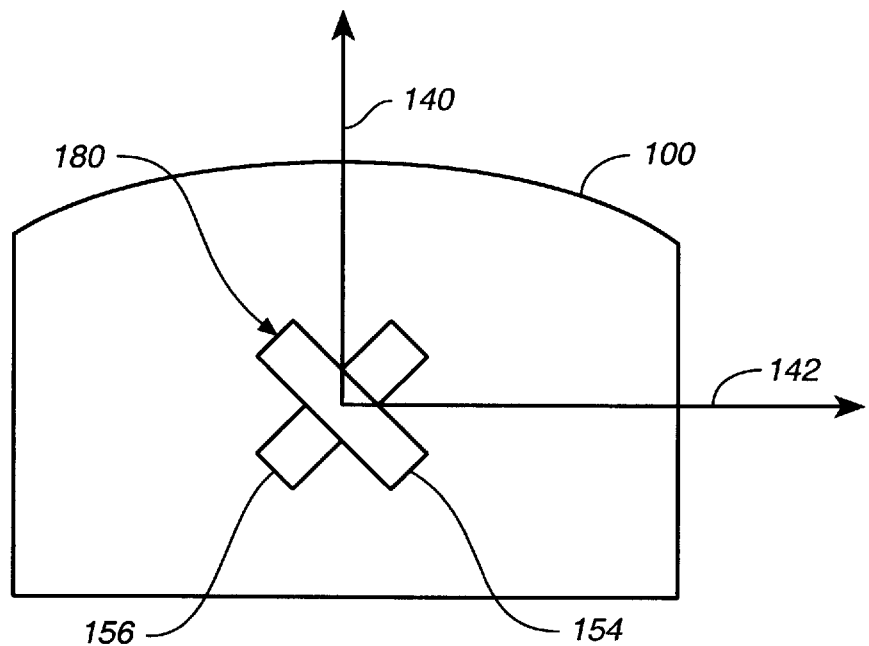
FIG._6A
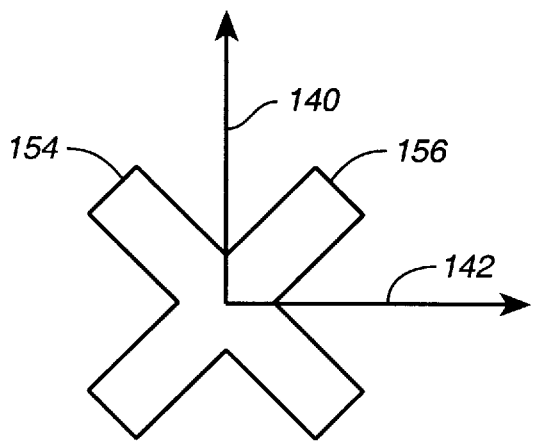
FIG._6B
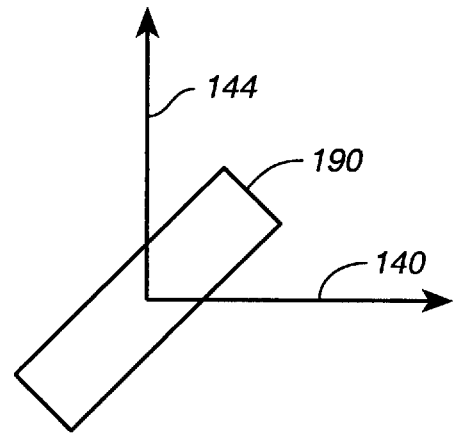
FIG._6C

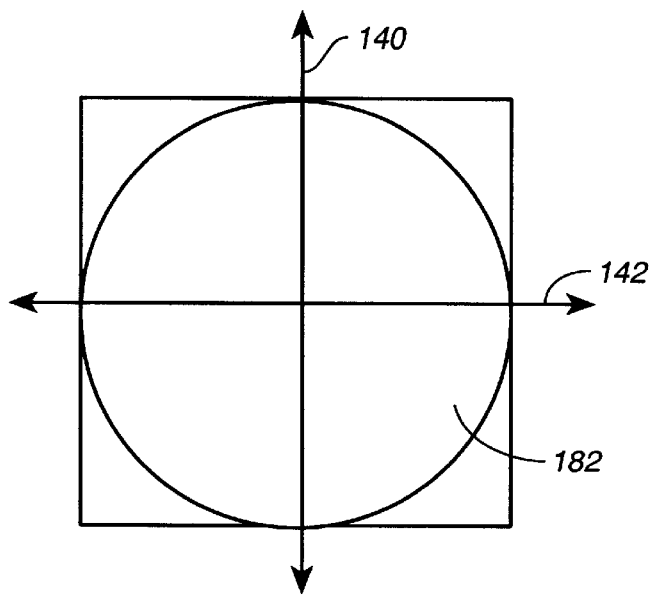
FIG._7A
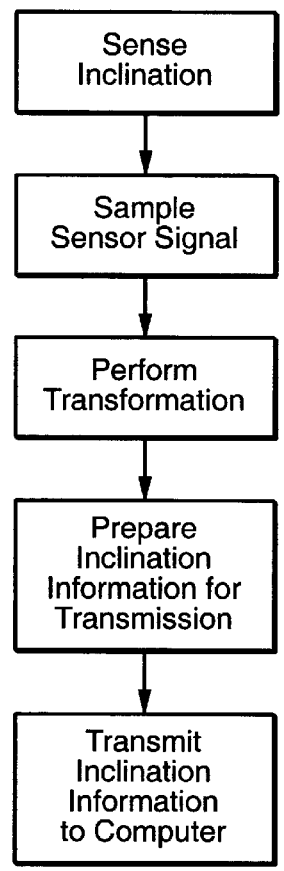
FIG._8
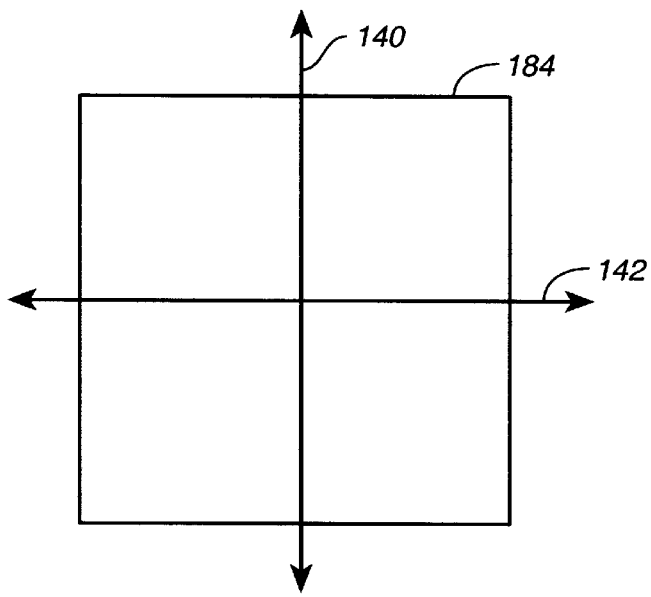
FIG._7B

COMPUTER INPUT DEVICE WITH INCLINATION SENSORS

BACKGROUND OF THE INVENTION

The present invention deals with a user input device. More particularly, the present invention deals with a user input device having inclination sensors disposed thereon to detect inclination of the user input device.

Many different types of user input devices are currently used for providing user input information to a computer. Such user input devices can include, for example, a point and click device (which is referred to as a computer mouse), a keyboard, joystick, and a track ball. Such user input devices all typically sense the movement of a movable element relative to a fixed base or housing portion and provide the computer with an input signal indicative of that relative movement.

Recently, however, free-space type user input devices have been introduced. Such devices use gravity-sensing accelerometers to sense inclination of the user input device, in free space, relative to a gravity vector. Where a plurality of such sensors are provided, the sensors sense inclination of the user input device about a plurality of inclination axes. Such information is provided to a computer to control a cursor, a player, or a vehicle inside of a computer application or simulation, for example.

In conventional free-space type input devices, a pair of accelerometers are fabricated on a single silicon substrate and are mounted onto a single package. The accelerometers have sensing axes which are directed orthogonally to one another. Such typical devices, it is believed, have the accelerometers mounted within the user input device such that the orthogonal accelerometer sensing axes are aligned with the primary axes of expected rotation or inclination of the user input device. For example, in one embodiment, one of the sensing axes of the accelerometers is aligned with the pitch axis of the user input device, while the orthogonally mounted sensing axis is aligned with the roll axis of the user input device. This has led to a number of different problems.

Because the two sensing axes are mounted in a fixed orthogonal relationship, the output from the accelerometers can never exceed a total of 90 degrees of sensed inclination. In other words, as one of the sensing axes is being tilted in an active direction (i.e., such that the sensing axis can sense inclination in that direction), the other sensing axis is being tilted toward a non-active inclination angle. Thus, the sum of the output of the two accelerometers can never exceed 90 degrees. Therefore, the range of inclination angles which can be sensed by conventional devices is quite narrow.

In addition, the output of conventional accelerometers is non-linear for most angles. The output is generally sinusoidal. Thus, the sensor can be slightly too sensitive to motions around a center point, yet largely insensitive to motions at the edges of the range of angles which can be sensed.

SUMMARY OF THE INVENTION

A computer input device includes a user manipulable portion having a first primary axis of motion. An inclination sensor has a first sensing axis. The inclination sensor is coupled to the user manipulable portion such that the first sensing axis is disposed at a first offset angle relative to the first primary axis of motion. An output component is coupled to the inclination sensor and provides output information indicative of sensed inclination.

BRIEF DESCRIPTION OF THE DRAWINGS

FIG. 1 is a block diagram of a computer system with which the present invention can be used.

FIG. 2 is a more detail block diagram of a user input device in accordance with one aspect of the present invention.

FIGS. 3A–3E illustrate primary axes of rotation of a free-space type user input device, and the placement of accelerometers on a conventional device.

FIGS. 4A–4C illustrate the operation of an inclination sensor in accordance with one aspect of the present invention.

FIGS. 5A and 5B illustrate the output of a prior art inclination sensor.

FIGS. 6A–6C illustrate an input device with an inclination sensor mounted in accordance with one aspect of the present invention.

FIGS. 7A and 7B illustrate the output of a user input device in accordance with one aspect of the present invention.

FIG. 8 is a flow diagram illustrating operation of a user input device in accordance with one aspect of the present invention.

DETAILED DESCRIPTION OF THE PREFERRED EMBODIMENTS

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer or other computing device. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention is also applicable in distributed computing environments where tasks are performed by remote processing devices that are linked through a communications network. In a distributed computing environment, program modules may be located in both local and remote memory storage devices.

With reference to FIG. 1, an exemplary environment for the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memory (RAM), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device (or mouse) 42. Other input devices (not shown) may include a microphone, joystick, game pad, satellite dish, scanner, or the like. Similarly, a free-space type user input device 100 (discussed in greater detail with respect to FIG. 2) can also be used. These and other input devices are often connected to the processing unit 21 through one of a plurality of ports. For instance, keyboard 40 is connected through a keyboard port 45, and mouse 42 is connected through serial port interface 46 but could also be connected through a MousePort or a PS/2 port. In the illustrative embodiment, keyboard port 45 and serial port interface 46 are coupled to the system bus 23. User input devices may also be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices such as speaker 45 and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

FIG. 2 is a more detailed block diagram of a user input device 100 in accordance with one aspect of the present invention. User input device 100 can be implemented as any user input device in which it is desirable to sense inclination of the user input device and provide the sensed information to computer 20 for use in controlling computer 20, or a portion of computer 20. User input device 100 includes microcontroller 102, inclination sensor 104, amplifier and filter circuitry 106, voltage regulator 108, light emitting diodes (LEDs) 110, control pad 112, wheel encoders 116, and connection device (or connection cable) 118.

Microcontroller 102 includes analog-to-digital converter 120, timing circuit 122, read only memory (ROM) 124, random access memory (RAM) 126, central processing unit (CPU) 128 and output port 130. In one embodiment, output port 130 comprises a universal serial bus (USB) port or a game port.

LEDs 110 provide user observable indicia of certain desired operations, in a known manner. Control pad 112, in one illustrative embodiment, includes control buttons, control keys, an eight-way direction pad, user actuable switches, triggers, etc., all of which are arranged to provide signals to microcontroller 102 indicative of desired user inputs. Wheel encoder 116 is configured to encode movement of a wheel or other rotatable or movable device in the user input device 100, which is movable relative to a base or housing of user input device 100. Cable 118 is preferably a cable suited for transmission of information from microcontroller 102 to computer 20 using a suitable link. In one preferred embodiment, an optional USE adapter is also provided with cable 118. In still another illustrative embodiment, cable 118 can be replaced by a wireless communication link, such as an infra-red or radio frequency communication link.

Inclination sensor 104, in accordance with one illustrative embodiment, includes sensors configured with sensing axes arranged orthogonally to one another. However, as will be described in more detail later in the specification, the sensing axes are arranged relative to user input device 100 such that they are disposed at an offset angle, offset from the primary axes of motion of user input device 100.

Voltage regulator 108 provides a regulated voltage to inclination sensor 104. Amplifier and filter circuitry 106 amplifies and performs appropriate filtering and other signal conditioning on the signal provided by inclination sensor 104, such that it can be received and converted to digital form by analog-to-digital converter 120.

In operation, user input device 100 receives a variety of user inputs and provides them over cable 118 to computer 20. For example, user input device 100 may typically receive any number of different types of user inputs from control pad 112, and wheel encoder 116. In addition, however, user input device 100 also receives inputs from inclination sensor 104. As the user rotates user input device 100 (and hence inclination sensor 104) relative to the primary axes of motion of user input device 100, inclination sensor 104 provides signals to amplifier and filter circuitry 106 which indicate inclination about those axes. The signals from inclination sensor 104 are amplified and conditioned by circuitry 106 and provided to analog-to-digital converter 120 where they are converted to digital form for use by the remainder of microcontroller 102. In a preferred embodiment, microcontroller 102 is an 8-bit microcontroller which performs a transformation on the signals received by analog-to-digital converter 120 in order to remove non-linearities associated with inclination sensor 104. The inclination information embodied in the transformed signal is then provided, through output port 130 and cable 118, to computer 20.

While user input device 100 can take any number of physical forms, FIGS. 3A–3E illustrate one form. FIG. 3A is a perspective view of one embodiment of user input device 100 connected to computer 20 by cable 118. In the embodiment illustrated in FIG. 3A, user input device 100 includes a housing portion 132 as well as a pair of hand grip portions 134 and 136. A plurality of user input devices and buttons are provided on control pad 112 and a number of other user actuable buttons (or triggers) 138 are also provided. In order to operate user input device 100, the user grasps hand grips 134 and 136 and tilts housing 132 relative to one or more of a plurality of primary axes of motion 140, 142 and 144, and also depresses switches on pad 112 and uses triggers 138, to provide user input signals to computer 20. Computer 20 is then controlled based on those signals.

FIGS. 3B, 3C and 3D illustrate the movement of user input device 100 relative to the three primary axes of motion 140, 142 and 144, illustrated in FIG. 3A. In FIG. 3B, the user tilts or inclines user input device 100 about axis 140 (which is directed into and out of the page of FIG. 3B) in a direction generally indicated by arrow 146. This is referred to as a roll movement, and axis 140 is referred to herein as the roll axis.

FIG. 3C illustrates that the operator can also incline user input device 100 about axis 142 which is shown disposed into and out of the page of FIG. 3C. The inclination is typically directed in a direction generally indicated by arrow 148. Such inclination is referred to as pitch movement, and axis 142 is referred to herein as the pitch axis.

FIG. 3D illustrates movement of user input device 100 relative to axis 144 (which is also shown disposed into and out of the page of FIG. 3D). Such movement is in a direction generally indicated by arrow 150 and is referred to as a yaw movement. Thus, axis 144 is referred to herein as the yaw axis.

In one prior implementation of a free-space type user input device, the inclination sensor sensed only inclination about two axes. FIG. 3E illustrates prior art placement of an inclination sensor 152 within user input device 100. Inclination sensor 152, in the prior art device, had a first sensing axis 154 and a second sensing axis 156. Sensing axes 154 and 156 were generally aligned with roll axis 140 and pitch axis 142. Thus, as the user rolled user input device 100 about axis 140 or pitched user input device 100 about axis 142, inclination sensor 152 sensed those motions and provided signals indicative of such inclination for use by computer 20. However, as will be described later, alignment of sensing axes 154 and 156 with the roll and pitch axes 140 and 142 significantly limits the range of inclination angles which can be sensed.

FIGS. 4A–4C illustrate the operation of an inclination sensor (in accordance with one aspect of the present invention), in more detail. In FIGS. 4A–4C, an accelerometer is used as the inclination sensor. In an ideal accelerometer, an electrical output signal is provided (such as resistance, current or voltage) which varies linearly with applied acceleration. For example, a voltage-output accelerometer ideally outputs a voltage potential having twice the magnitude when exposed to one G (1 times the force of gravity) as when exposed to 0.5 G (0.5 times the force of gravity). Further, an ideal accelerometer measures acceleration only along one axis of its three dimensional form.

For example, FIG. 4A depicts a simplified illustration of a one-axis accelerometer 160. Accelerometer 160 senses acceleration only along its longitudinal axis, in the direction indicated by arrow 162, but ignores acceleration (in that the acceleration has no effect on its output signal) in all other directions. When an accelerometer is used as an inclinometer (or tilt sensor), the acceleration of gravity is measured to provide the angle of inclination. Thus, if accelerometer 160 is moved from a rest position (designated by the vector $V_{REST}$) in FIG. 4B and is inclined 90° from horizontal (denoted by angle A and designated by the gravity vector $V_G$), the output of accelerometer 160 goes from a zero level output (when it was in the position illustrated by vector $V_{REST}$) to an output indicative of full gravity acceleration (when it is inclined by the angle A to the position illustrated by the gravity vector $V_G$) Even when accelerometer 160 is motionless, it provides an output indicative of the component of acceleration acting along its longitudinal axis.

FIG. 4C illustrates a vector diagram in which accelerometer 160 has been rotated by an angle B to a position represented by the vector $V_{ACC}$ since accelerometer 160 senses some component of acceleration in this position. The orthogonal axis (orthogonal to $V_{ACC}$) is designated $V_{IGN}$ because accelerometer 160 ignores any effects of gravity in this direction. $V_{IGN}$ is offset from $V_{REST}$ by an angle C. Note that C-B is 90°. It should also be noted that $V_{IGN}+V_{ACC}$ calculated using vector mathematics (rather than scalar mathematics) $=V_G$. The magnitude of $V_{ACC}$ sensed by accelerometer 160 will be $V_G$ * sine (B). Since the sine waveform is non-linear for most angles, the output of accelerometer 160 is a non-linear output.

In a two-axis inclination sensor, a pair of accelerometers is mounted to the user input device such that the accelerometers are permanently linked to one another with the two sensing axes being disposed at right angles to each other. Thus, the sensing axis of the first accelerometer is equal to the insensitive axis of the second accelerometer. Further, the output of both accelerometers, in sum, must not exceed 90°.

Due to the fact that the output of the accelerometers are non-linear, and are sinusoidal, and also due to the fact that the sum of the outputs of the accelerometers cannot exceed 90°, when applied to a practical input device, plotted as a grid, a grid pattern illustrated in FIG. 5A is developed. The grid pattern represents the sensor output corresponding to inclination of the sensor about the pitch and roll axes shown in FIG. 5A. As can be seen, grid pattern 170, in FIG. 5A, has an outer periphery which is generally circular. Near the edges of circular plot 170, the output is highly insensitive to further inclination of the input device 100. At the center of circular plot 170, the output is slightly over-sensitive to changes in the inclination angle. This is due to the non-linear output of the inclination sensor.

FIG. 5B illustrates an output plot 172 for an inclination sensor arranged as illustrated in FIG. 3E, after the output has undergone a transformation. In other words, the output of the sensor can be transformed to reduce or eliminate non-linearities associated with the sensor. For example, in one illustrative embodiment, the output of the sensor undergoes an arcsine transformation to linearize the output. Thus, grid 170 shown in FIG. 5A, after transformation, is illustrated by grid 172 in FIG. 5B. After transformation, the pattern is substantially diamond shaped. Therefore, in order to obtain a square and linear output response from the sensor, one must confine the outputs to an even smaller plot area defined by 174. This even further limits the output response of the sensor.

FIGS. 6A–6C illustrate user input device 100 with an inclination sensor 180 in accordance with one illustrative aspect of the present invention. User input device 100 is similar to that shown in FIG. 3A, and similar items are similarly numbered. However, rather than having inclination sensor 180 mounted to user input device 100 such that the sensitive axes 154 and 156 thereof are in alignment with the primary axes of motion 140 and 142, inclination sensor 180 is mounted such that its sensing axes 154 and 156 are disposed at an offset angle relative to primary axes 140 and 142. In one preferred embodiment, the offset angle is approximately 45°.

FIG. 7A illustrates an output plot 182 which is indicative of the output of sensor 180 when inclined relative to the pitch and roll axes 140 and 142. Note that plot 180 is substantially similar to plot 170 shown in FIG. 5A. However, FIG. 7B illustrates the output 184 of sensor 180 after a suitable transformation. It should be noted that output plot 184 is no longer diamond shaped as is output plot 172 illustrated in FIG. 5B. Instead, output 184 is reoriented with respect to the primary axes of motion 140 and 142 such that it is square relative to those axes. This allows substantially the entire output range defined by plot 184 to be used in sensing inclination angles, rather than a small cutout portion (such as plot 174 illustrated in FIG. 5B). Therefore, simply by reorienting the inclination sensor on user input device 100, the present invention provides a greatly increased range of angles of inclination which can be sensed. The present invention also provides a square output response. Performing a simple transformation, such as an arcsine transformation, the present invention further provides a highly linear output. All of these advantages can be obtained substantially without adding any cost to the user input device. Instead, the inclination sensor is simply rotated approximately 45° and mounted in the rotated position.

It should also be noted that the present invention can be used with additional inclination sensors. For example, FIGS. 6B and 6C illustrate that sensor 180 is mounted with axes 154 and 156 disposed at an offset angle which is preferably 45° relative to pitch axis 140 and roll axis 144. FIG. 6C also illustrates that an additional sensing axis 190 can be provided, in accordance with one aspect of the present invention, to sense inclination relative to yaw axis 144. As with axes 154 and 156, axis 190 is preferably disposed at an offset angle (illustratively 45° relative to yaw axis 144. In such an embodiment, the output of the sensor would still provide a square response, and transformation would render the output substantially linear.

FIG. 9 is a flow diagram illustrating operation of operator input device 100 in accordance with one illustrative aspect of the present invention. First, the operator inclines the housing of operator input device 100 relative to any of axes 140, 142 and 144. Then, the inclination sensor 180 senses that inclination and provides a sensor signal. This is indicated by block 192. Microcontroller 102 (shown in FIG. 2) samples the sensor signal, illustratively on a periodic basis. This is indicated by block 194. After receiving a sampled signal, microcontroller 102 performs a transformation on the signal in order to linearize the signal. In accordance with one aspect of the present invention, microcontroller 102 simply accesses a look-up table stored in ROM 124 or RAM 126, based on the sensor signal, and obtains an appropriate output value from the look-up table. In another preferred embodiment, microcontroller 102 performs the transformation substantially on-the-fly (as the sensor signal is read). In the latter embodiment, either a microprocessor, or an arithmetic logic unit (such as an ALU in CPU 128) performs the transformation.

It should also be noted that, in accordance with one aspect of the present invention, an arcsine transformation is performed either on-the-fly or using a look-up table. However, other transformation functions can also be used, such as an arctangent function or a hybrid transformation function. For example, it may be desirable, in some instances, for the output signal to maintain some non-linear characteristics. Thus, a desired function can be derived for performing the transformation, yet still allowing the output signal to maintain some non-linearities. Performance of the transformation is indicated by block 196.

Next, the information indicative of the sensed inclination is prepared for transmission. In one preferred embodiment, the information is prepared according to a protocol defined by a universal serial bus. In another preferred embodiment, the information is prepared according to a protocol defined by a game port. In any case, preparation of the inclination information for transmission is indicated by block 198.

The inclination information is then transmitted to computer 20 where it is used in control of computer 20 applications run on computer 20, etc. This is indicated by block 200.

Thus, it can be seen that the present invention provides a system with which a square, linear output can be obtained from an inclination sensor in a user input device with little or no added cost. Further, the sensor is arranged to be capable of sensing a much wider range of inclination angles.

In accordance with one illustrative embodiment of the present invention, the inclination sensors used are available under the commercial designation ADXL202 Low-Gravity Dual-Axis Silicon MEM Accelerometers from Analog Devices Corp. However, other inclination sensors can be used as well.

Further, while the present invention has been described with respect to accelerometers, it should be noted that a number of other suitable types of inclination sensors can also be used. For example, tilt fluid sensors could also be used, as could silicon micromachines, electrolytic fluid sensors, piezo-electric cantilevered beam sensors, etc.

Although the present invention has been described with reference to preferred embodiments, workers skilled in the art will recognize that changes may be made in form and detail without departing from the spirit and scope of the invention.

What is claimed is:

1. A computer input device, comprising:
   a user manipulable portion having a first primary axis of rotation about which the user manipulable portion is adapted to rotate;
   an inclination sensor adapted to sense an inclination of the user manipulable portion about a first sensing axis, the inclination sensor being coupled to the user manipulable portion such that the first sensing axis is disposed at a first offset angle relative to the first primary axis of rotation; and
   an output component coupled to the inclination sensor providing output information indicative of sensed inclination.

2. The computer input device of claim 1 wherein the user manipulable portion includes a second primary axis of rotation about which the user manipulable portion is adapted to rotate and wherein the inclination sensor is adapted to sense an inclination of the user manipulable portion about a second sensing axis, the inclination sensor being coupled to the user manipulable portion such that the second sensing axis is disposed at a second offset angle relative to the second primary axis of rotation.

3. The computer input device of claim 2 wherein the first and second offset angles are each approximately 45 degrees.

4. The computer input device of claim 2 wherein the first and second primary axes of rotation comprises pitch and roll axes, respectively.

5. The computer input device of claim 1 wherein the inclination sensor provides a sensor signal indicative of the sensed inclination, and further comprising:

a transformation component coupled to the inclination sensor and configured to reduce non-linearities in the sensor signal.

6. The computer input device of claim 5 wherein the transformation component implements an arcsine transformation.

7. The computer input device of claim 5 wherein the transformation component includes a computer readable storage device including a look-up table.

8. The computer input device of claim 5 wherein the transformation component includes a logic unit configured to calculate transformed values based on the sensor signal as the sensor signal is provided by the inclination sensor.

9. The computer input device of claim 2 wherein the user manipulable portion includes a third primary axis of rotation about which the user manipulable portion is adapted to rotate and wherein the inclination sensor is adapted to sense an inclination of the user manipulable portion about a third sensing axis, the inclination sensor being coupled to the user manipulable portion such that the third sensing axis is disposed at a third offset angle relative to the third primary axis of rotation.

10. A method of controlling a computer, comprising:

providing a user input device having a first primary axis of rotation about which the user input device is adapted to rotate;

sensing inclination of the user input device with an inclination sensor adapted to sense an inclination of the user input device about a first sensing axis and being coupled to the user input device such that the first sensing axis is disposed at a first offset angle relative to the first primary axis of rotation; and transmitting to the computer a signal indicative of the sensed inclination.

11. The method of claim 10 wherein sensing includes providing a sensor signal indicative of the sensed inclination and further comprising:

transforming the sensor signal from a first form to a second form prior to transmitting.

12. The method of claim 11 wherein transforming comprises:

performing an arcsine transformation on the sensor signal.

13. The method of claim 11 wherein transforming comprises:

performing an arctangent transformation on the sensor signal.

14. The method of claim 11 wherein transforming comprises:

accessing a look-up table based on the sensor signal.

15. The method of claim 10 wherein the user input device includes a second primary axis of rotation about which the user input device is adapted to rotate and wherein sensing includes sensing inclination of the user input device with the inclination sensor wherein the inclination sensor adapted to sense an inclination of the user input device about a second sensing axis, the inclination sensor being coupled to the user input device such that the second sensing axis is disposed at a second offset angle relative to the second primary axis of rotation.

16. The method of claim 15 wherein the first and second offset angles are each approximately 45 degrees.

17. The method of claim 15 wherein the first and second primary axes of rotation comprise pitch and roll axes, respectively, and wherein sensing inclination comprises:

sensing inclination of the user input device about the pitch and roll axes.

18. The method of claim 17 wherein the user input device includes a third primary axis of rotation about which the user input device is adapted to rotate and wherein sensing includes sensing inclination of the user input device with the inclination sensor wherein the inclination sensor adapted to sense an inclination of the user input device about a third sensing axis, the inclination sensor being coupled to the user input device such that the third sensing axis is disposed at a third offset angle relative to the third primary axis of rotation.

19. The method of claim 18 wherein the third primary axis of rotation comprises a yaw axis and wherein sensing inclination comprises:

sensing inclination of the user input device about the yaw axis.

* * * * *

UNITED STATES PATENT AND TRADEMARK OFFICE
CERTIFICATE OF CORRECTION

PATENT NO. : 6,249,274 B1  
DATED : June 19, 2001  
INVENTOR(S) : Svancarek et al.

It is certified that error appears in the above-identified patent and that said Letters Patent is hereby corrected as shown below:

<u>Title page,</u>  
Item [57], ABSTRACT,  
Line 6, "access" should be -- axis --

<u>Column 4,</u>  
Line 28, "USE" should be -- USB --

<u>Column 7,</u>  
Line 10, "plot 180" should be -- plot 182 --  
Line 40, "yaw axiz 144" should be -- yaw axis 144) --

<u>Column 10,</u>  
Line 33, "sensor adapted" should be -- sensor is addapted --

Signed and Sealed this

Twenty-ninth Day of June, 2004

JON W. DUDAS  
*Acting Director of the United States Patent and Trademark Office*